(No Model.)
G. W. SHARP.
BAND CUTTING AND FEEDING ATTACHMENT FOR THRASHING MACHINES.
No. 255,464. Patented Mar. 28, 1882.
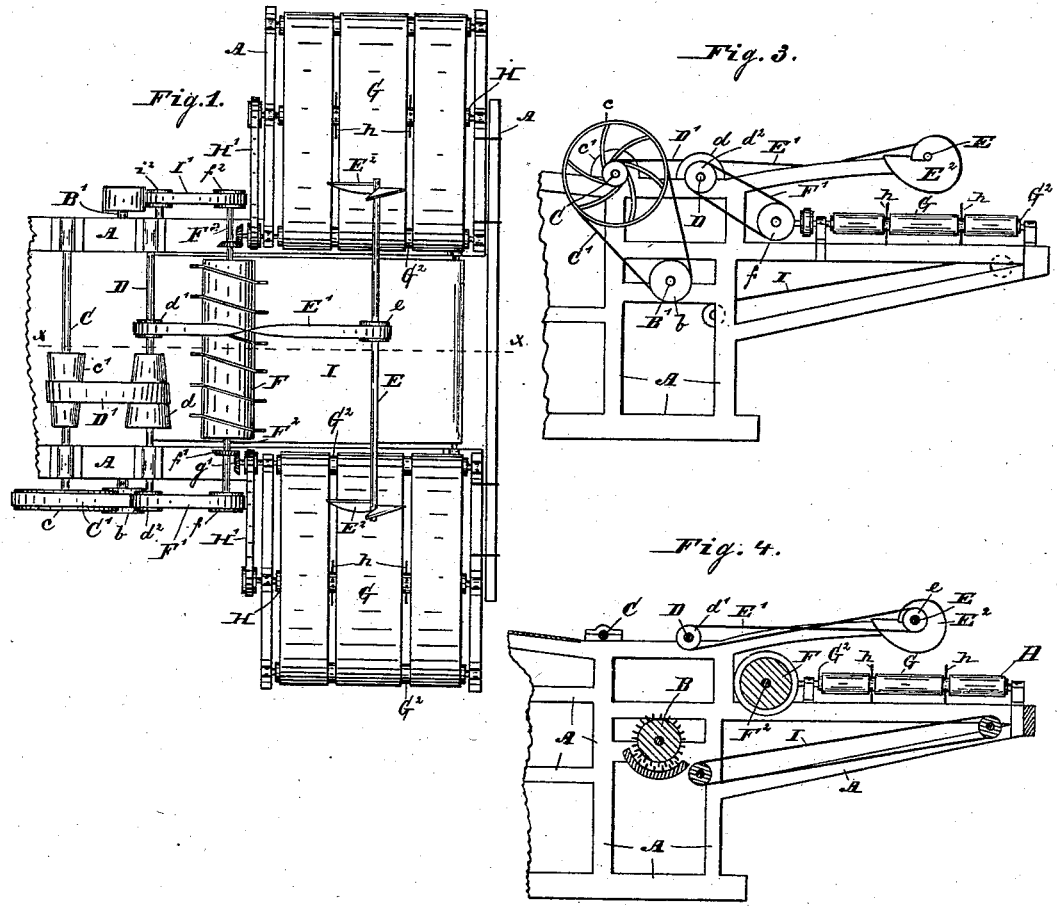
WITNESSES.
James B. Lizius.
R. P. Daggett.
INVENTOR.
George W. Sharp,
PER
C. Bradford
ATTORNEY.

UNITED STATES PATENT OFFICE.

GEORGE W. SHARP, OF CRAWFORDSVILLE, INDIANA.

BAND-CUTTING AND FEEDING ATTACHMENT FOR THRASHING-MACHINES.

SPECIFICATION forming part of Letters Patent No. 255,464, dated March 28, 1882.

Application filed September 27, 1881. (No model.)

*To all whom it may concern:*

Be it known that I, GEORGE W. SHARP, of the city of Crawfordsville, county of Montgomery, and State of Indiana, have invented certain new and useful Improvements in Conveying, Band-Cutting, and Distributing Attachments for Thrashing-Machines, of which the following is a specification.

The object of my said invention is to produce a system of mechanism by which grain can be conveyed to the thrashing-cylinder of a thrashing-machine in properly-distributed order for effective thrashing without the usual amount of manual labor. This object is accomplished by placing upon each side of the mouth of the machine traveling carriers, the outer ones of which shall discharge upon the inner or central one, locating above said carriers knives which shall cut the bands of the sheaves as they pass under them, and locating above the central carrier shaking or distributing devices, all as will hereinafter be more specifically set forth.

Referring to the accompanying drawings, which are made a part hereof, and on which similar letters of reference indicate similar parts, Figure 1 is a top or plan view of the front portion of a thrashing-machine embodying my invention; Fig. 2, a front elevation of the same; Fig. 3, a side elevation thereof, and Fig. 4 a longitudinal vertical section on the dotted line *x x* in Fig. 1.

In said drawings, the portions marked A represent the frame-work of the thrashing-machine, so far as shown, and of my attachment; B, the thrasher-cylinder or beater; C, the driving-shaft for my attachment; D, a countershaft; E, a shaft driving the band-cutters; F, the shaker or distributer; G G, the side carriers; H H, shafts centrally located in said carriers, carrying fingers which act as "crowders" for the sheaves; and I, the central carrier.

The frame-work A is constructed after the usual manner of frame-work for similar purposes, and supports the various shafts and other mechanism.

The cylinder B is similar to other thrasher-cylinders, and has a pulley, $b$, preferably upon the opposite ends of its shaft B′ to that whereon is the pulley by which it is itself driven, through which it drives the mechanism peculiar to my invention.

The shaft C is driven by a belt, C′, which connects the pulley $c$ thereon to the pulley $b$. It is also provided with a cone-pulley, $c'$.

The shaft D is driven by a belt, D′, which connects the cone-pulleys $d'$ and $c'$. These pulleys enable the speed of the mechanism driven from this shaft to be changed as desired, after the usual manner of cone-pulleys.

The shaft E is driven by the belt E′, which connects the pulleys $e$ and $d'$. Upon its ends are the cutters $E^2$ $E^2$, which cut the wire, twine, or straw with which the sheaves or bundles of grain are tied. These cutters are made in spiral form, the blade increasing in width as it approaches the side nearest the center of the machine, and has preferably a notched edge, like a sickle. By this means the bundle is allowed to pass freely under the knife at first, but is soon entered by it and is penetrated deeper and deeper thereby until the limit is reached, when the knife at once releases its hold, and the bundle (its band cut) passes freely on onto the central carrier. By graduating the twist of the knives properly the advance of the bundle will exactly correspond therewith, and therefore it will not be turned from its original position during the process of cutting the band or passing under said knife.

The shaker or distributer F is driven by a belt, F′, which connects the pulley $f$ to the pulley $d^2$. It is simply a large round shaft with flanges running around the same at an angle, which, when the shaft is revolved, will scatter and distribute the straw of the sheaves, so that when it reaches the thrasher-cylinder it shall be an evenly-distributed mass, and not in bunches, as it would be if the sheaves were not disturbed after they were cut open.

The carriers G G are simply ordinary endless carriers of any approved form, and the only novelty claimed in connection therewith is as one of the elements of the present combination. In the construction shown they are driven by the miter-gears $f'$ $g'$ upon the shafts $F^2$ $G^2$.

The shafts H are provided with fingers $h$, which engage with the sheaves as they pass down the carriers G and act as crowders for said sheaves. They are intended to run somewhat faster than the shafts of said carriers, so as to insure the accomplishment of their purpose. This may be done by making the pulleys upon the shafts H, by which they are driven through the medium of the belt H', of slightly less diameter than the pulleys whereby said belts are driven. In some cases the larger diameter of the track of the ends of the fingers $h$ over that of the rolls driving the carrier will be sufficient, it being understood, of course, that of two wheels or similar devices running at the same speed the larger has the greatest peripheral motion. By means of this arrangement the sheaves are kept always close upon each other as they pass under the band-cutters and to the carrier I, thus securing a perfectly even feed for the machine. The fingers $h$ are flexible, or mounted flexibly, so that they will spring back after a certain pressure has been reached, and therefore there is no danger of breaking them by overcrowding.

The central carrier, I, runs down into the machine and delivers the grain to the thrasher-cylinder or beater B. It is driven by a belt, I', running from the pulley $f^2$ to the pulley $i^2$.

The operation of my said invention is as follows: The sheaves of grain are delivered in any convenient manner upon the outer ends of the carriers G G. These carry them inwardly, where they first are caught by the crowders H, which force them against and alongside one another, usually in substantially parallel relation. The cutter-heads or knives $E^2$ then enter them and cut the bands which secure them together, after which they are delivered upon the carrier I. As they pass down this carrier the scatterer F enters the bundles, thoroughly separating them, so that they enter the thrasher in the form of evenly-distributed grain, the distributing being as evenly done as it could be by hand, and without any hand-labor whatever.

Having thus fully described my said invention, what I claim as new, and desire to secure by Letters Patent, is—

1. In a band-cutting attachment for thrashing-machines, the combination, with the table or carrier over which the sheaves pass, of a rotary cutter the head or knife of which runs transversely to the course of the carrier and is spiral in form, whereby its edge is caused to advance to correspond with the advance of the sheave, and mechanism for operating the same, substantially as shown and described, and for the purpose set forth.

2. In a band-cutting attachment for thrashing-machines, a cutter head or knife, $E^2$, the cutting-edge of which extends entirely around its shaft and is of gradually-increasing radius, substantially as shown and described, and for the purposes specified.

3. The combination of the grain-carriers G, mechanism for operating the same, the shafts H, which run at a greater speed than said carriers, and fingers $h$ on said shafts, which act as crowders and force the sheaves forward on said carrier, substantially as shown and described, and for the purposes specified.

In witness whereof I have hereunto set my hand and seal, at Crawfordsville, Indiana, this 21st day of September, A. D. 1881.

GEORGE W. SHARP. [L. S.]

In presence of—
WILLIAM BURBRIDGE,
ROBERT BLAIR.